United States Patent
Li et al.

(10) Patent No.: US 9,953,422 B2
(45) Date of Patent: Apr. 24, 2018

(54) SELECTIVE LOCAL REGISTRATION BASED ON REGISTRATION ERROR

(71) Applicant: Motorola Mobility LLC, Chicago, IL (US)

(72) Inventors: Dalong Li, Naperville, IL (US); Daniel Maack Bloom, Loveland, CO (US); Jing-Nan Zhu, Buffalo Grove, IL (US)

(73) Assignee: Motorola Mobility LLC, Chicago, IL (US)

( * ) Notice: Subject to any disclaimer, the term of this patent is extended or adjusted under 35 U.S.C. 154(b) by 122 days.

(21) Appl. No.: 15/051,191

(22) Filed: Feb. 23, 2016

(65) Prior Publication Data
US 2017/0243351 A1  Aug. 24, 2017

(51) Int. Cl.
*G06T 3/00* (2006.01)
*G06T 7/00* (2017.01)
*G06T 3/40* (2006.01)

(52) U.S. Cl.
CPC .......... *G06T 7/0028* (2013.01); *G06T 3/0093* (2013.01); *G06T 3/40* (2013.01); *G06T 7/0002* (2013.01)

(58) Field of Classification Search
CPC ......... G06T 7/30–7/38; G06T 3/0068–3/0081; G06K 9/6203–9/6211
See application file for complete search history.

(56) References Cited

U.S. PATENT DOCUMENTS

| | | | | |
|---|---|---|---|---|
| 8,938,130 | B2 * | 1/2015 | Moate | G01S 13/90 382/128 |
| 2014/0147043 | A1 * | 5/2014 | Muninder | G06T 7/408 382/167 |
| 2014/0369557 | A1 * | 12/2014 | Kayombya | G06K 9/00624 382/103 |
| 2016/0360104 | A1 * | 12/2016 | Zhang | G06T 3/0062 |

OTHER PUBLICATIONS

Connelly Barnes, et al., "The Generalized PatchMatch Correspondence Algorithm", http://www.connellybarnes.com/work/publications/2010_generalized_pm.pdf, 2010, 14 pages.
Connelly Barnes, et al., "PatchMatch: A Randomized Correspondence Algorithm for Structural Image Editing", http://gfx.cs.princeton.edu/pubs/Barnes_2009_PAR/patchmatch.pdf, 2009, 10 pages.

* cited by examiner

*Primary Examiner* — Brian Werner
(74) *Attorney, Agent, or Firm* — Kunzler, PC

(57) ABSTRACT

For selective local registration based on registration error, a method determines a first registration error between a template image and a source image. The method further warps the source image to compensate for camera motion in response to the first registration error exceeding a registration error threshold. In addition, the method determines a second registration error between the template image and the warped source image. The method generates a pixel difference mask using the template image. The method further selectively performs local registration for the source image based on the pixel difference mask in response to the second registration error exceeding the registration error threshold.

20 Claims, 14 Drawing Sheets

SELECTIVE LOCAL REGISTRATION BASED ON REGISTRATION ERROR

BACKGROUND

Field

The subject matter disclosed herein relates to image registration and more particularly relates to hybrid image registration.

Description of the Related Art

Image registration is a technique used to transform different sets of image data into one coordinate system. Image registration is a key technology that enables features such as image stabilization and multiple image de-noising. Image registration can be used to compensate for motion, either camera motion or scene motion. Scene motion is difficult to model parametrically and compensating for scene motion is a time-consuming process.

BRIEF SUMMARY

A method for selective local registration based on registration error is disclosed. The method determines a first registration error between a template image and a source image. The method further warps the source image to compensate for camera motion in response to the first registration error exceeding a registration error threshold. In addition, the method determines a second registration error between the template image and the warped source image. The method generates a pixel difference mask using the template image. The method further selectively performs local registration for the source image based on the mask in response to the second registration error exceeding the registration error threshold. An apparatus and program product also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
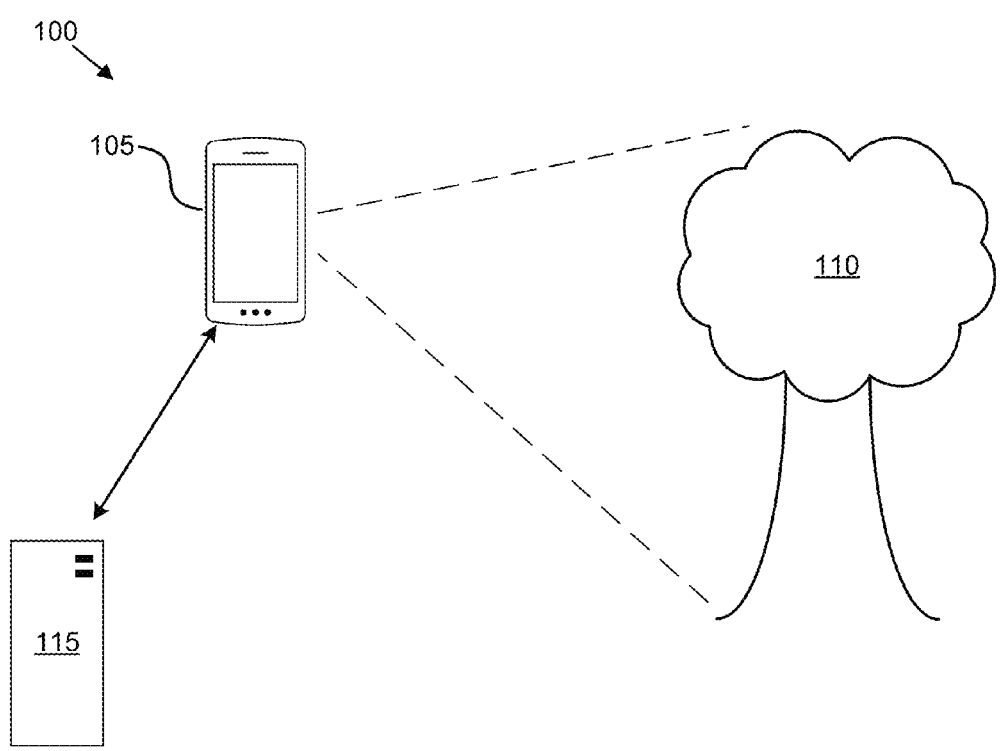
FIG. 1 is a drawing illustrating one embodiment of a camera system for hybrid image registration.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The disclosed embodiments provide systems, apparatuses, methods, and program products for a hybrid system of automatic image registration. In image registration, multiple images captured sequentially are combined together to produce a single image result. Image registration has wide-ranging applications and is a prerequisite for many image-processing technologies, such as multiple image de-noising, high dynamic range imaging (HDR), super resolution, restoration, panorama, video stabilization, and the like. The disclosed hybrid system of automatic image registration combines both global registration techniques and local registration techniques in a way that is computationally friendly, thereby improving efficiency and quality of the image registration.

The disclosed embodiments intelligently combine global registration, which compensates for camera motion, with local registration, which compensates for scene motion. The disclosed embodiments determine whether variances due to noise or signal (e.g., motion) and apply combination of global and local registration techniques to quickly minimize the registration error. In particular, local registration techniques are selectively applied to specific locations using a pixel difference mask, thereby saving time and computing resources needed for image registration.

FIG. 1 is a schematic block diagram illustrating one embodiment of a camera system 100. The camera system 100 may capture, record, and manage images. In the depicted embodiment, the camera system 100 includes an electronic device 105. The electronic device 105 may be a camera. Alternatively, the electronic device 105 may be a mobile telephone, a tablet computer, laptop computer, or the like with the camera embodied in the electronic device 105. The camera may capture an image of the subject 110.

In some embodiments, the electronic device 105 captures a plurality of images of the subject 110. Further, the electronic device 105 may perform image registration using the plurality of images of the subject 110. As described herein, the electronic device 105 may apply hybrid image registration (as disclosed herein) for video stabilization, computer vision, target recognition, medical/logical imaging, or other applications. As used herein, image registration refers to transforming different sets of data into one coordinate system. Hybrid image registration, as disclosed herein, refers to selective local registration based on registration error.

In certain embodiments, the electronic device 105 may determine a first registration error using a template image and a source image. The electronic device 105 may then warp the source image to compensate for camera motion (e.g., motion of the electronic device 105) in response to the first registration error exceeding registration error threshold. The electronic device 105 may determine a second registration error using the template image and the warped source image. In response to the second registration error exceeding the registration error threshold, the electronic device 105 may generate a pixel different mask using the template image and perform local registration for the source image based on the pixel difference mask.

As used herein, registration error refers to the differences between any two images of the same subject 110. In one embodiment, the registration error is any non-zero displacement of a pixel or feature between the two images. The registration error can be mathematically defined as a mean squared error function of the pixel deviations using Equation 1, where $e_R$ is the registration error, M is the image height, N is the image width, F(i,j) is a pixel value of a first image at the location (i,j), and G(i,j) is pixel value of a second image at the location (i,j).

$$e_R = \frac{\sum_{i=1}^{M} \sum_{j=1}^{N} (F(i,j) - G(i,j))^2}{M \times N} \quad \text{Equation 1}$$

The electronic device 105 seeks to reduce the registration error by performing the hybrid image registration described herein. First, the electronic device 105 determines the first registration error using a template image and a source image in order to determine if the differences between the template and source images are due to more than noise. If the first registration error exceeds a registration error threshold, then there are differences due to signal rather than noise. The electronic device 105 then uses global registration techniques to warp the source image, thereby compensating for camera movement.

Next, the electronic device calculates a second registration error using the warped source image. If the registration error still exceeds the registration error threshold, then local registration, such as patch matching, is selectively performed using a pixel difference mask. In certain embodiments, the electronic device 105 calculates a third registration error using the locally registered image (e.g., the result of the local registration). If the third registration error is smaller than the earlier errors (e.g., first and second registration errors), then local image registration has reduced the error and the electronic device 105 may use the final registered image. Otherwise, if the third registration error is larger than the previous registration errors, then the electronic device 105 may reject and/or discard the locally registered image and use either the warped source image (e.g., the globally registered image) or the original source image as a final image. Accordingly, the electronic device 105 selects as the final image an image having the lowest registration error among the original source image, the warped source image, and the locally registered image.

In some embodiments, the camera system 100 may include an image-processing server 115. The image-processing server 115 may be located remotely from the electronic device 105. In one embodiment, the electronic device 105 transmits images to the image-processing server 115, wherein the image-processing server 115 performs hybrid image registration using the received images. In some embodiments, the image-processing server 115 performs hybrid image registration as a precursor to video stabilization, image stacking, multiple image de-noising, high dynamic range (HDR) imaging, or other image processing tasks.

In certain embodiments, the image-processing server 115 may determine a first registration error using a template image and a source image. In one embodiment, but the template image and the source image are received at the image-processing server 115 from the electronic device 105. The image-processing server 115 may then warp the source image to compensate for camera motion (e.g., motion of the electronic device 105) in response to the first registration error exceeding registration error threshold. The image-processing server 115 may determine a second registration error using the template image and the warped source image. In response to the second registration error exceeding the registration error threshold, the image-processing server 115 may generate a pixel different mask using the template image and perform local registration for the source image based on the pixel difference mask.

Figure 2A:
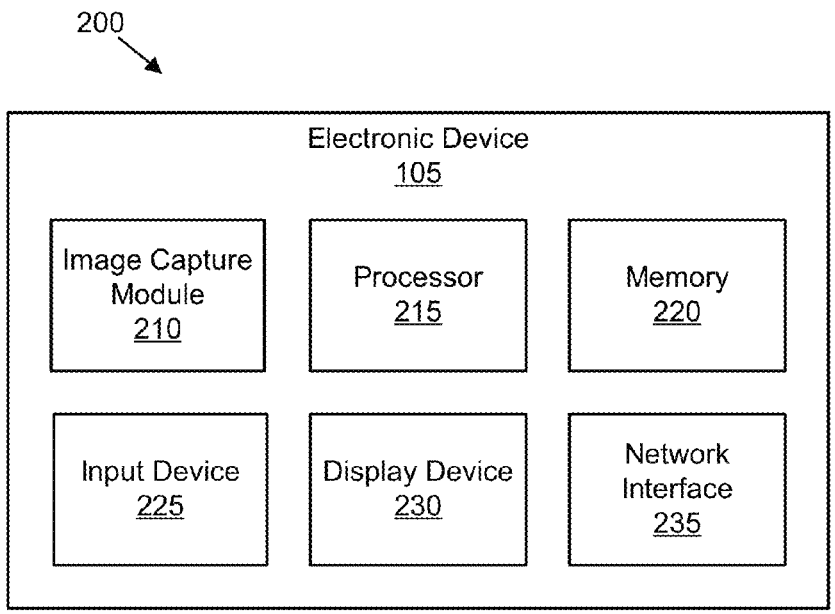
FIG. 2A is a schematic block diagram illustrating one embodiment of a computer for hybrid image registration.

FIG. 2A is a schematic block diagram illustrating a computer 200 for hybrid image registration, a according to embodiments of the disclosure. The computer 200 may be embodied in the electronic device 105. In the depicted embodiment, the computer 200 includes an image capture module 210, a processor 215, a memory 220, an input device 225, a display device 230, and a network interface 235.

The image capture module 210, in one embodiment, may include any known image sensor for capturing image data. The image capture module 210 may capture a plurality of images of the subject 110, including at least a template image and a source image. In some embodiments, the image capture module 210 configured to capture images of the subject 110 using various camera parameters. The image capture module 210 may provide these camera parameters to the processor 215 in order to estimate noise variance of the captured images, as discussed in further detail below.

The processor 215, in one embodiment, may include any known controller capable of executing computer-readable instructions and/or capable of performing logical operations. For example, the processor 215 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 215 executes instructions stored in the memory 220 to perform the methods and routines described herein. The processor 215 is communicatively coupled to the memory 220, the input device 225, the output device 230, and the wireless transceiver 225.

In some embodiments, the processor 215 is configured to determine a first registration error using a template image in a source image. As used herein, the registration error refers to pixel differences between the template image and the source image. These differences may include differences in pixel properties, including, but not limited to, hue, intensity, grayscale, color value, and color depth.

The processor 215 may compare the template image to the source image on a pixel-by-pixel basis. The pixel-wise difference may be compared to a pixel difference threshold to determine whether the two pixels are significantly different. If the pixel-wise difference exceeds the pixel difference threshold, then the pixels are categorized as different. In some embodiments, the processor 215 stores the location of pixels that are different. Otherwise, if the pixel-wise difference does not exceed the pixel difference threshold, then the pixels are characterized as identical.

The processor 215 may calculate the registration error based on the number of pixels that are different. In some embodiments, the registration error is a ratio of the number of different pixels to the total number of pixels in the image. Accordingly, if a comparison of the template image to the source image results in 10 pixels being identified as different, with a total number of pixels in each image being 100, then the registration error may be 0.1 indicating a 10% difference between the two images.

The processor 215 may further compare the first registration error to a registration error threshold. In one embodiment, the processor 215 sets the registration error threshold based on an image noise value of the template image (or, alternatively, of the source image). As used herein, image noise refers to random, unwanted variations of brightness or color. Image noise may be due to electronic noise in the camera or electronic device 105. The amount of image noise present in an image may be greater for images taken in low light environments. -wise As some level of image noise is expected in each of the template image in the source image, it is expected that the number of different pixels will be nonzero even if there is no camera motion, no change in camera settings, and no motion of the subject 110 between the template image and the source image. Thus, the processor 215 may estimate the noise value and set the registration error threshold based on the noise value, so as to ignore the expected number of different pixels due to image noise. In some embodiments, the processor 215 may also set the pixel difference threshold based on the noise value.

If the first registration error exceeds the registration error threshold, then the two images (e.g., template image and source image) are significantly different from one another, and are thus candidates for image registration techniques. Otherwise, if the first registration error does not exceed the registration error threshold, then the two images are substantially similar to one another and image registration is not needed.

Accordingly, if the processor 215 determines the first registration error exceeds the registration error threshold, then the processor 215 will first adjust to the source image to compensate for camera motion using global registration techniques. In global registration, only a few correspondences between two images are needed in order to compute a transformation matrix (also referred to herein as a homography matrix). The transformation (homography) matrix is then used to warp the source image, thereby correcting for camera motion. Global registration is fast, but introduces image artifacts where there is scene motion between the template image and the source image.

In one embodiment, the processor 215 uses homography to compensate for camera motion. The processor 215 may identify pixels and/or features common to both the template image and the source image. Using the common pixels and/or features, the processor 215 may generate a transformation matrix. In one embodiment, the transformation matrix is a pixel-based homography matrix. In another embodiment, the transformation matrix is a feature-based homography matrix. While feature based homography can be quicker than pixel based homography, in certain embodiments, the feature based homography may fail to correct camera motion and/or introduce an unacceptable number of artifacts due to motion of the feature points between images (e.g., if the feature points are taken for moving objects in the scene). Thus, in one embodiment the processor 215 selects between pixel-based homography and feature-based homography based on available resources (processing resources, memory resources), image size, time restrictions, and the like.

In some embodiments, the processor 215 downscales both the template image and the source image prior to generating the transformation matrix. Downscaling the images increases computational efficiency, as fewer pixels need to be compared. Where downscaling is used, the processor 215 modifies the homography matrix to compensate for the downscaling (and later upscaling) of the images.

In some embodiments, the processor 215 modifies the homography matrix to compensate for downscaling/upscaling using the following procedure. Let $H_0$ represent the unmodified homography matrix. The modified matrix ($H_{new}$) is generated using matrix multiplication of three matrices, an expand matrix $A_e$, the homography matrix $H_0$ (e.g., the pre-modified homography matrix), and a shrink matrix $A_s$. $H_{new}$ is calculated as the matrix product of the matrices $A_e$, $H_0$, and $A_s$, shown in Equation 2, below, where $A_e$, $H_0$, and $A_s$ all have a size of 3×3.

$$H_{new}=A_e H_0 A_s \qquad \text{Equation 2}$$

$H_{new}$ is used to transform the full resolution images.

Recall that order is critical in matrix multiplication. The values of the expand matrix $A_e$ and the shrink matrix $A_s$ are based on the downscaling factor used to downscale the template image and the source image. As an example, assume that the downscaling factor is two (2). The resulting expand matrix $A_e=$ and the shrink matrix $A_s$ are:

$$A_e = \begin{bmatrix} 2.0 & 0 & 0.5 \\ 0 & 2.0 & 0.5 \\ 0 & 0 & 1.0 \end{bmatrix} \text{ and } A_s = \begin{bmatrix} 0.5 & 0 & -0.25 \\ 0 & 0.5 & -0.25 \\ 0 & 0 & 1.0 \end{bmatrix}.$$

As another example, where the downscaling factor is four (4), then the resulting expand matrix $A_e=$ and the shrink matrix $A_s$ are:

$$A_e = \begin{bmatrix} 4.0 & 0 & 1.5 \\ 0 & 4.0 & 1.5 \\ 0 & 0 & 1.0 \end{bmatrix} \text{ and } A_s = \begin{bmatrix} 0.25 & 0 & -0.375 \\ 0 & 0.25 & -0.375 \\ 0 & 0 & 1.0 \end{bmatrix}.$$

While specific downscaling factors are used in the above examples, the present disclosure is not limited to the specific downscaling factors disclosed.

Responsive to warping the source image (thereby generating a "warped source image"), the processor 215 determines a second registration error using the template image and the warped source image. The second registration error may be determined using similar techniques used to determine the first registration error, as discussed above. The processor 215 may generate a pixel difference mask using the template image. In some embodiments, the processor 215 concurrently determines the second registration error and generates the pixel difference mask. The pixel difference mask indicates locations where pixel differ, for example, between the template image and the warped source image (alternatively, between the template image and the original source image).

If the second registration error exceeds the registration error threshold, then the template image and the warped source image still significantly differ from one another, and thus local registration is used to compensate for scene motion in the source image otherwise, if the second registration error does not exceed the registration error threshold, then the two images are substantially similar to one another and image registration is complete.

Accordingly, if the processor 215 determines the second registration error exceeds the registration error threshold, then the processor 215 uses local registration techniques to compensate for scene motion in the source image. In local registration, the processor 215 searches the images (template and source images) to match small local regions. Local registration can be time-consuming. Accordingly, the processor 215 uses the pixel difference mask to identify candidate areas within the source image. The processor 215 then uses local registration only on the candidate areas, thereby improving image registration efficiency and accuracy. One example of the local registration technique is "patch matching."

Because the processor 215 has already compensated for camera motion, the pixel difference mask allows the processor 215 to quickly identify regions of image difference that are caused by scene motion. Scene motion cannot be corrected using a transformation matrix, but rather each pixel is searched independently to find its best match (e.g., using patch matching). Accordingly, hybrid automatic image registration improves image registration efficiency and accuracy by first compensating for camera motion and then compensating for scene motion only at specific areas identified using the pixel mask.

In one embodiment, the processor 215 compares the first registration error to the second registration error in order to determine whether global registration introduced additional error (e.g., noise and/or artifacts) into the warped source image. In response to the processor 215 determining that the first registration error is greater than the second registration error, then the processor 215 uses the warped source image when performing local registration. However, the processor 215 will discard the warped source image and instead use the original source image in response to the first registration error being less than the second registration error.

Recall that the first registration error is based on the original source image, while the second registration error is based on the warped source image. If the first registration error is greater than the second registration error, then the global registration reduced error. This is typical where camera motion is the dominant source of differences between the template image and the source image. Otherwise, if the first registration error is less than the second registration error, then the global registration increased error. This is typical where scene motion is the dominant source of differences between the template image and the source image. The pixel difference mask may be generated from and/or modified using the source image (e.g., original source image or warped source image) associated with the lowest registration error.

The memory 220, in one embodiment, is a computer readable storage medium. In some embodiments, the memory 220 includes volatile computer storage media. For example, the memory 220 may include a RAM, including dynamic RAM ("DRAM"), synchronous dynamic RAM ("SDRAM"), and/or static RAM ("SRAM"). In some embodiments, the memory 220 includes non-volatile computer storage media. For example, the memory 220 may include a hard disk drive, a flash memory, or any other suitable non-volatile computer storage device. In some embodiments, the memory 220 includes both volatile and non-volatile computer storage media. In some embodiments, the memory 220 stores data relating to hybrid automatic image registration, such as a template image, a source image, a warped source image, a transformation matrix, and the like. In some embodiments, the memory 220 also stores program code and related data, such as an operating system or other controller algorithms operating on the electronic device 105.

The input device 225, in one embodiment, may include any known computer input device including a touch panel, a button, a keyboard, a stylus, a microphone, or the like. In some embodiments, the input device 225 may be integrated with the output device 230, for example, as a touchscreen or similar touch-sensitive display. In some embodiments, the input device 225 includes a touchscreen such that text may be input using a virtual keyboard displayed on the touchscreen and/or by handwriting on the touchscreen. In some embodiments, the input device 225 includes two or more different devices, such as a keyboard and a touch panel.

The output device 230, in one embodiment, may include any known electronically controllable display or display device. The output device 230 may be designed to output visual, audible, and/or haptic signals. In some embodiments, the output device 230 includes an electronic display capable of outputting visual data to a user. For example, the output device 230 may include, but is not limited to, an LCD display, an LED display, an OLED display, a projector, or similar display device capable of outputting images, text, or the like to a user. As another, non-limiting, example, the output device 230 may include a wearable display such as a smart watch, smart glasses, a heads-up display, or the like. Further, the output device 230 may be a component of a smart phone, a personal digital assistant, a television, a table computer, a notebook (laptop) computer, a personal computer, a vehicle dashboard, or the like.

In certain embodiments, the output device 230 includes one or more speakers for producing sound. For example, the output device 230 may produce an audible alert or notification (e.g., a beep or chime). In some embodiments, the output device 230 includes one or more haptic devices for producing vibrations, motion, or other haptic feedback. In some embodiments, all or portions of the output device 230 may be integrated with the input device 225. For example, the input device 225 and output device 230 may form a touchscreen or similar touch-sensitive display. In other embodiments, the output device 230 may be located near the input device 225.

The network interface 235, in one embodiment, includes communication hardware for communicating with the image-processing server 115. In one embodiment, the network interface 235 may comprise a wireless network interface, wherein the electronic device 105 communicates with the image-processing server 115 via wireless medium (e.g., radio). In another embodiment, the network interface 235 may comprise a wired network interface, wherein the electronic device 105 communicates with the image-processing server 115 via wires or cables. In a further embodiment, the network interface 235 includes both a wireless network interface and a wired network interface.

Figure 2B:
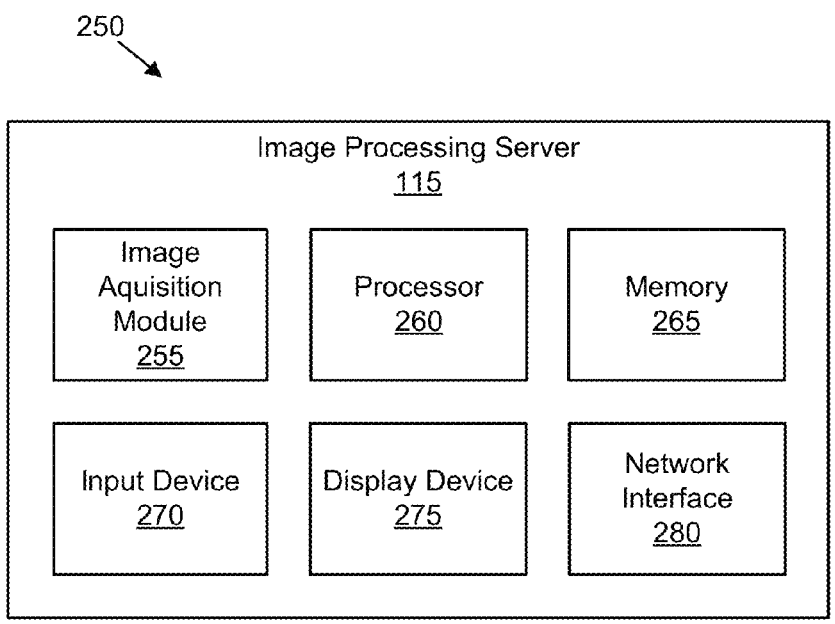
FIG. 2B is a schematic block diagram illustrating another embodiment of a computer for hybrid image registration.

FIG. 2B is a schematic block diagram illustrating a computer 250 for hybrid image registration, according to embodiments of the disclosure. The computer 250 may be embodied in the image-processing server 115. In the depicted embodiment, the computer 250 includes an image acquisition module 255, a processor 260, a memory 265, an input device 270, a display device 275, and a network interface 280. The processor 260, memory 265, input device 270, display device 275, and network interface 280 may be substantially similar to the processor 215, memory 220, input device 225, display device 230, and network interface 235 described above with reference to FIG. 2A.

Accordingly, the processor 260 may include any known controller capable of executing computer-readable instructions and/or capable of performing logical operations. Thus, the processor 260 may execute instructions stored in the memory 265 to perform the methods and routines described herein. Specifically, the processor 260 may determine registration error, or a source image, generated pixel difference mask, perform local registration of the source image, identify a noise level of the template image, and the like similar to the processor 215 discussed above.

The memory 265 may be any known computer readable storage medium, including both volatile and non-volatile computer storage media. In some embodiments, the memory 265 stores data relating to hybrid automatic image registration. In some embodiments, the memory 265 also stores program code and related data, such as an operating system or other controller algorithms operating on the image-processing server 115. The network interface 280, in one embodiment, includes communication hardware for communicating with the electronic device 105 using one or more of a wireless communication medium and a wired communication medium.

Image acquisition module 255 is configured to acquire an image for image processing. In one embodiment, the image acquisition module receives two or more images from an electronic device 105 via the network interface 280. In some embodiments, the image acquisition module 255 may tag or otherwise order received images. For example, the image acquisition module 255 may tag a first received image as a template image and tag additional received images as source images. Thereafter, the processor 260 may operate on the template image and a source image(s), as discussed above.

Figure 3A:
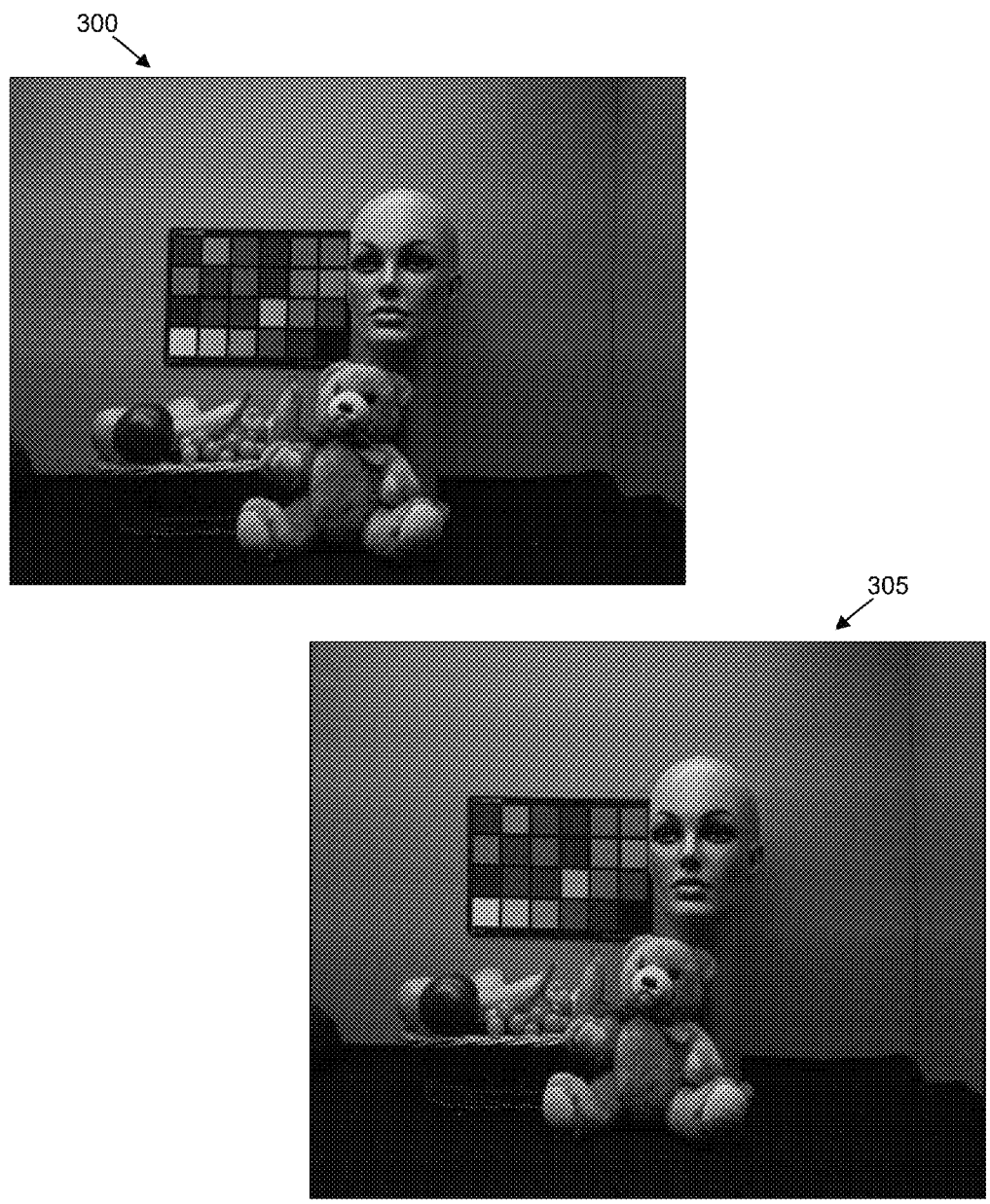
FIG. 3A is a schematic block diagram illustrating one embodiment of template and source images.

FIGS. 3A-3E depict a first example of hybrid image registration according to the disclosed embodiments. FIG. 3A depicts two input images, a template image 300 and a source image 305. As depicted, there is little scene motion between the template image 300 and the source image 305. Instead, differences between the two images 300, 305 are predominately the result of image noise and camera motion (e.g., vibrations, slight variations perspective, etc.).

Figure 3B:
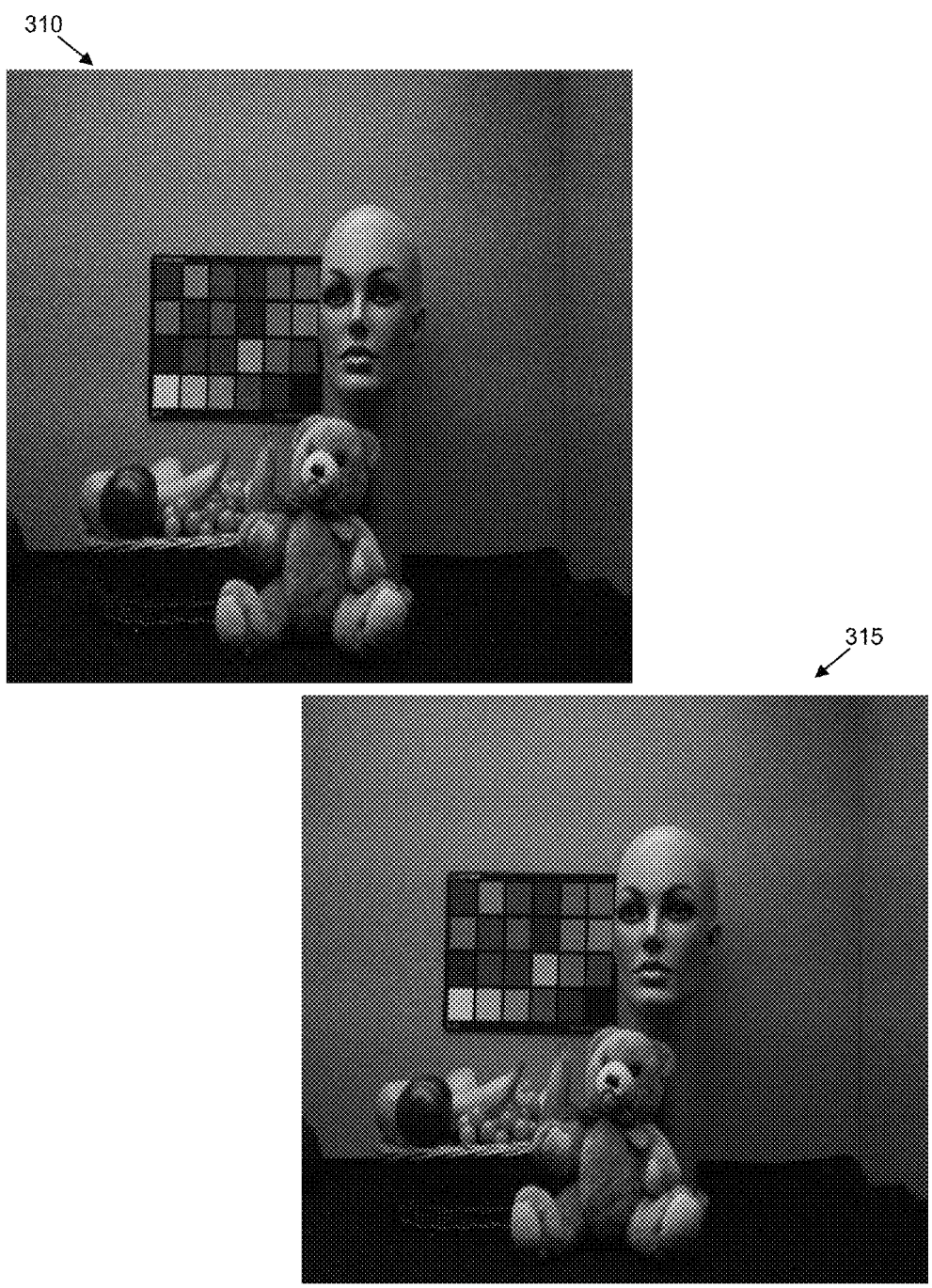
FIG. 3B is a schematic block diagram illustrating one embodiment of a first registered image and first overlay image.

FIG. 3B illustrates a first registered image 310 and a first overlay image 315. The first registered image 310 is generated, for example using the electronic device 105 and/or the image-processing server 115, by performing a global registration technique on the template image 300 and the source image 305. In one embodiment, the global registration technique includes warping the source image 305 to compensate for camera motion. Thus, the first registered image 310 represents a warped source image, described above. In certain embodiments, a homography matrix is computed to compensate for the camera motion. The source image 305 is then transformed (e.g., warped) using the homography matrix to generate the first registered image 310. The first overlay image 315 is a composite image created by overlaying (e.g., superimposing) the first registered image 310 with the template image 300. The first overlay image 315 illustrates the degree of similarity between the first registered image 310 and the template image 300.

Figure 3C:
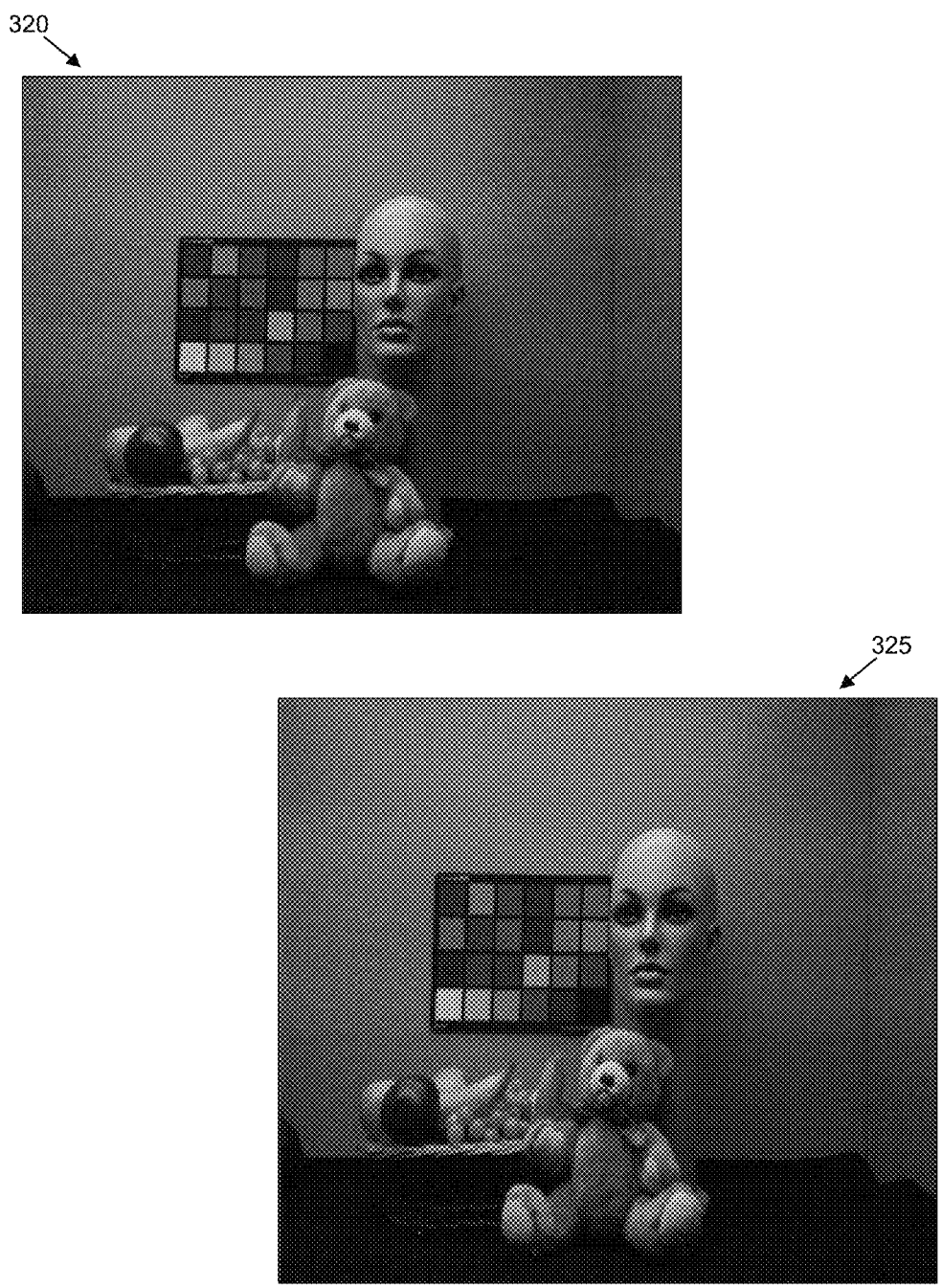
FIG. 3C is a schematic block diagram illustrating one embodiment of a second registered image and second overlay image.

FIG. 3C illustrates a second registered image 320 and a second overlay image 325. The second registered image 320 is generated, for example using the electronic device 105 and/or the image-processing server 115, by performing a local registration technique using the template image 300 and either the source image 305 or the first registered image 310. The electronic device 105 and/or the image-processing server 105 may select between the source image 305 and the first registered image 310 based on a registration error of the source image 305 and of the first registered image 310. For example, if the registration error of the first registered image 310 is larger than the registration error of the source image 305, then the global registration was ineffective and the source image 305 should be used to generate the second registered image 320. Conversely, if the registration error of the first registered image 310 is smaller than the registration of the source image 305, then the global registration was effective and the first registered image 310 should be used to generate the second registered image 320. The second overlay image 325 is a composite image created by overlaying (e.g., superimposing the second registered image 320 with the template image 300. The second overlay image 325 illustrates the degree of similarity between the second registered image 320 and the template image 300.

Figure 3D:
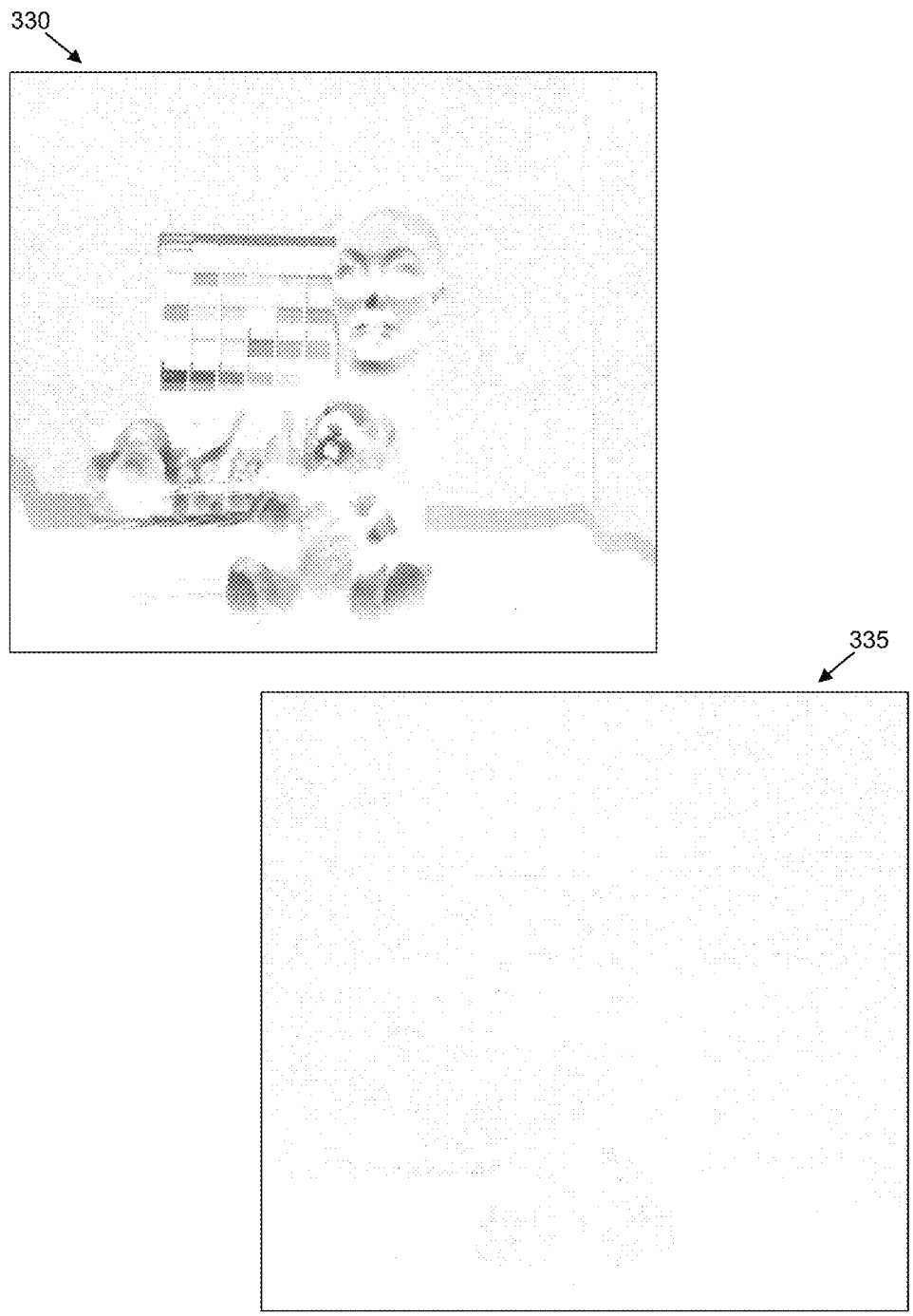
FIG. 3D is a schematic block diagram illustrating one embodiment of a first difference image and second difference image.

FIG. 3D illustrates a first difference image 330 and a second difference image 335. The first difference image 330 is generated by comparing the template image 300 to the source image 305. The first difference image 330 depicts the pixel-wise difference between the template image 300 and the source image 305. Here, light-colored regions in the first difference image 330 indicate regions of substantial similarity between the template image 300 and the source image 305. The first difference image 330 shows image difference before the hybrid registration described herein.

To generate the first difference image 330, the electronic device 105 and/or the image-processing server 115 compare a pixel-wise color difference between the template image 300 and the source image 305 to a pixel difference threshold. The pixel difference threshold is used to distinguish motion from noise in an image. In certain embodiments, the pixel difference threshold is based on a noise variance of the template image 300 (or, alternatively, of the source image 305). Image noise variance (e.g., of the template image 300) may be estimated using camera parameters (e.g., gain and exposure time) or by directly calculating the noise variance of the image.

In one embodiment, the pixel difference threshold is calculated from the noise variance using Equation 3, where $T_P$ is the pixel difference threshold, k is a parameter between 3 and 5, and NV is the noise variance for the image (e.g., either the template image or the source image).

$$T_P = k \times \sqrt{NV} \qquad \text{Equation 3}$$

Here, the square root of the image noise variance (e.g., "$\sqrt{NV}$") is the standard deviation of the noise. Therefore, if pixel difference is less than $T_P$, it is from noise and it is ignored. Otherwise, if the pixel difference is greater than $T_P$, it is from signal and is significant difference between the two images (e.g., template image 300 and source image 305). It should be noted that successful image registration ignores differences due to noise (e.g., if difference is less significant, i.e. smaller than noise, then the image registration is successful).

To calculate the image noise variance, the electronic device 105 and/or the image processing server 115 divide an image (e.g., the template image 300) into regions (also referred to as blocks). A regional noise variance is then computed for each region. In one embodiment, only gray values of the image (e.g., the template image 300) are used to calculate noise variance instead of using RGB space. After calculating the regional variance for each of the regions, the electronic device 105 and/or the image-processing server 115 determines whether each region/block is smooth. A smooth-block technique they may be used where the regional noise variance compared to a variance threshold. In some embodiments, an Otsu method (or similar method) may be used to compute an optimal variance threshold based on a histogram of the region/block variances.

After calculating the variance threshold, the electronic device 105 and/or the image processing server 115 identify those regions (blocks) having a smaller regional noise variance than the variance threshold as being smooth blocks. The noise variance for the entire image (e.g., "NV") is the mean of the smooth block variances. Because image variance comes from both signal (e.g., motion) and noise, the image noise variance is calculated using smooth block variance as variance in these regions is predominately from noise. In contrast, non-smooth blocks are regions having lots of contrast, edges, motion, etc. and the variance of these regions is predominately from signal.

The second different image 335 is generated by comparing the template image 300 to the second registered image 320. The second difference image 335 depicts the pixel-wise difference between the template image 300 and the second registered image 325. Again, light-colored regions in the second difference image indicate regions of substantial similarity between the template image 300 and the second registered image 325. The second different image 335 shows image difference after the hybrid registration described herein. Here, hybrid registration has limited substantially all differences originally present between the template image 305 and the source image 305. Accordingly, the second registered image 325 represents successful image registration.

Figure 3E:
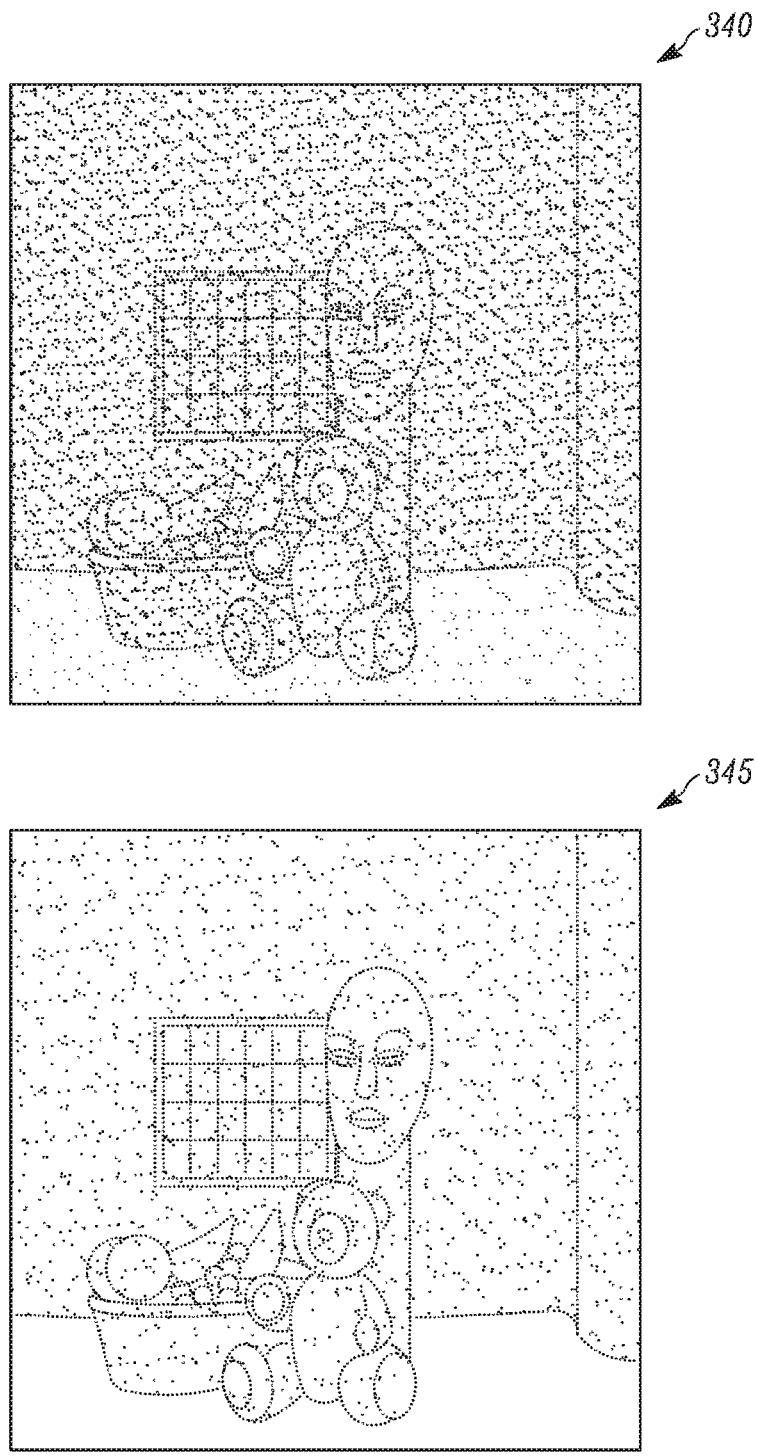
FIG. 3E is a schematic block diagram illustrating one embodiment of pixel difference masks.

FIG. 3E illustrates a first pixel difference mask 340 and a second pixel difference mask 345. The pixel difference masks 340, 345 may be used in dividing image registration tasks using the hybrid registration described herein. Here, dark pixels in each mask represent areas where local registration is to be performed. By using the pixel difference masks 340, 345 local registration (a time-consuming, resource intensive process) selectively applied so as to reduce the overall time (and resources) needed to perform local registration (e.g., patch matching).

The first pixel difference mask 340, in one embodiment, is created by the electronic device 105 and/or the image-processing server 115 computing a difference image of the template image 300 and the first registered image 310 and comparing this difference image to the pixel difference threshold. The first pixel difference mask 340 is a binary image, each pixel in the first pixel difference mask 340 indicating whether the pixel difference threshold was exceeded by the corresponding pixel in the difference image. Pixels in the difference image having a difference value greater than the pixel difference threshold (e.g., the residuals) indicate locations of remaining differences between the template image 300 and the first registered image 310. If the number of residuals (e.g., of the template image 300 compared to the first registered image 310) exceed a registration error threshold, and local registration (e.g., patch matching) may be performed at the locations indicated by the first pixel difference mask 340.

In some embodiments, the electronic device 105 and/or the image-processing server 115 may apply a morphological filter to the first pixel difference mask 340, thereby creating the second pixel difference mask 345. The morphological filtering to the first pixel difference mask 340 removes noise from the first pixel difference mask 340. As depicted, the second pixel difference mask 345 contains fewer dark pixels and therefore fewer locations where local registration is to be performed.

Figure 4A:
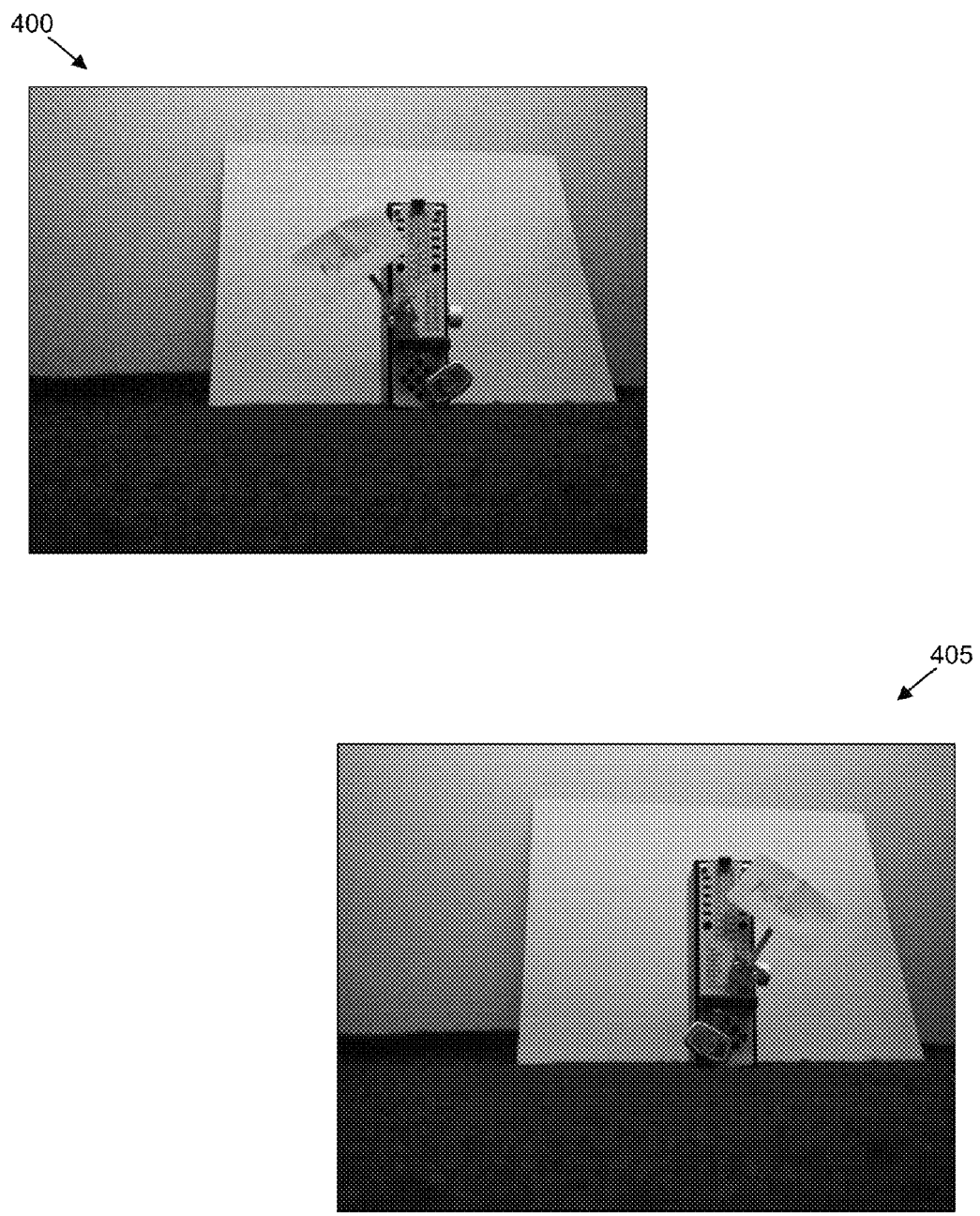
FIG. 4A is a schematic flow chart diagram illustrating another embodiment of template and source images.

FIGS. 4A-4E depict a second example of hybrid image registration according to the disclosed embodiments. FIG. 4A depicts two input images, a template image 400 and a source image 405. As depicted, there is significant scene motion between the template image 400 and the source image 405.

Figure 4B:
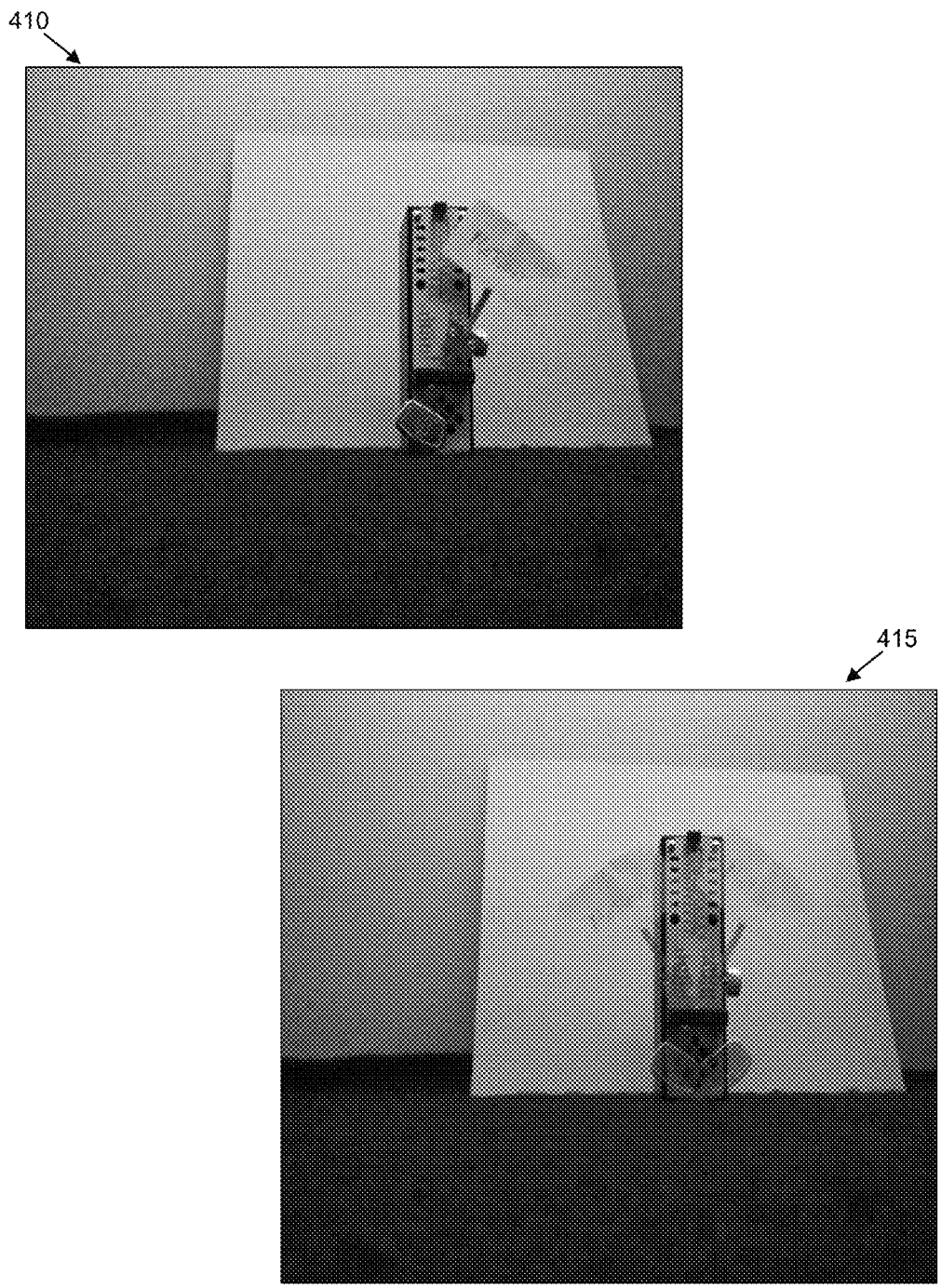
FIG. 4B is a schematic flow chart diagram illustrating another embodiment of a first registered image and first overlay image.

FIG. 4B illustrates a first registered image 410 and a first overlay image 415. The first registered image 410 is generated, for example using the electronic device 105 and/or the image-processing server 115, by performing a global registration technique on the template image 400 and the source image 405. In one embodiment, the global registration technique includes warping the source image 405 to compensate for camera motion. Thus, the first registered image 410 represents a warped source image, as described above. In certain embodiments, a homography matrix is computed to compensate for the camera motion. The source image 405 is then transformed (e.g., warped) using the homography matrix to generate the first registered image 410. The first overlay image 415 is a composite image created by overlaying (e.g., superimposing) the first registered image 410 with the template image 400. The first overlay image 415 illustrates the degree of similarity between the first registered image 410 and the template image 400.

Figure 4C:
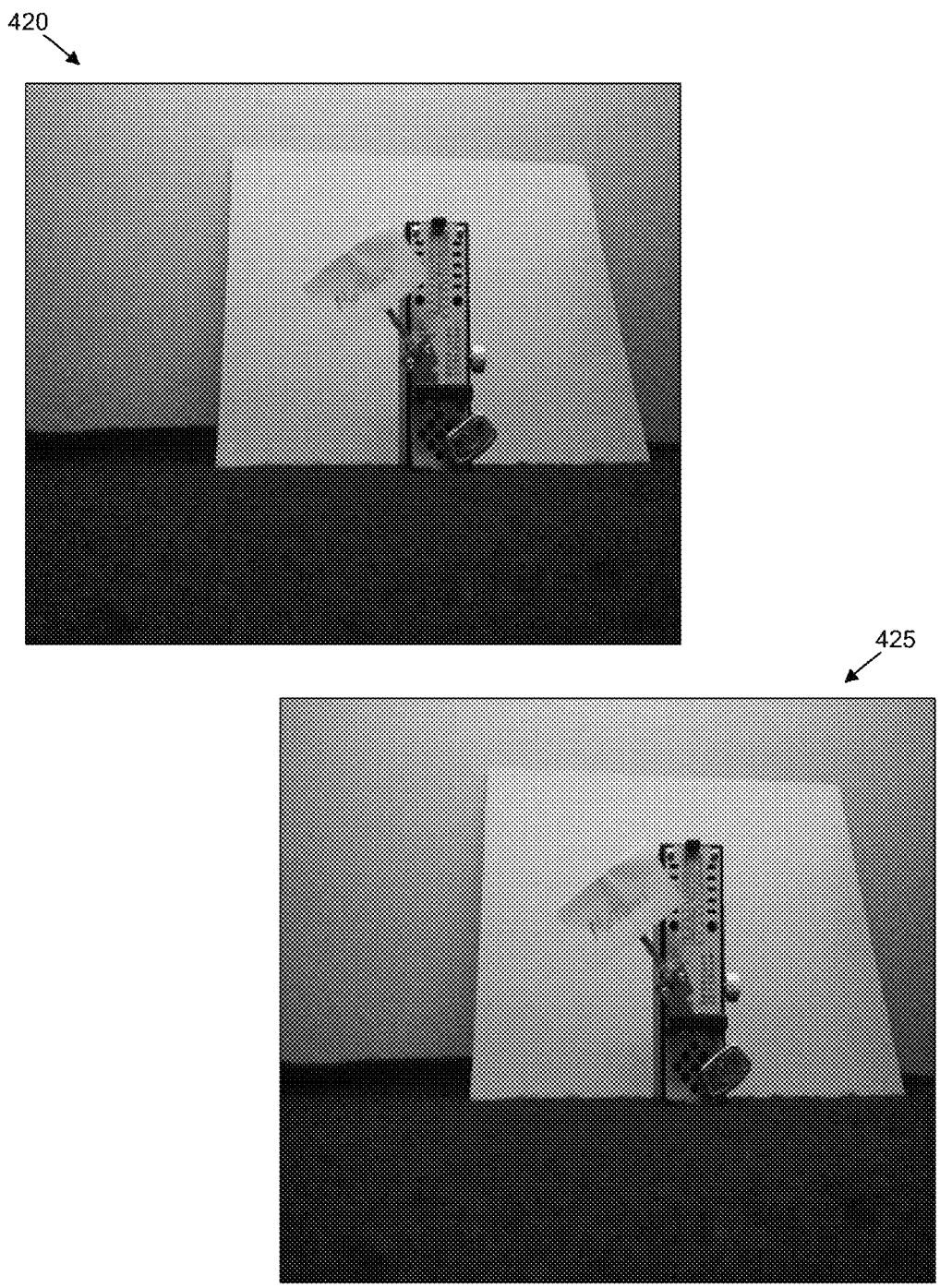
FIG. 4C is a drawing illustrating another embodiment of a second registered image and second overlay image.

FIG. 4C illustrates a second registered image 420 and a second overlay image 425. The second registered image 420 is generated, for example using the electronic device 105 and/or the image-processing server 115, by performing a local registration technique using the template image 400 and one of the source image 405 and the first registered image 410. The electronic device 105 and/or the image-processing server 105 may select between the source image 405 and the first registered image 410 based on a registration error of the source image 405 and of the first registered image 410. The second overlay image 425 is a composite image created by overlaying (e.g., superimposing the second registered image 420 with the template image 400. The second overlay image 425 illustrates the degree of similarity between the second registered image 420 and the template image 400.

Figure 4D:
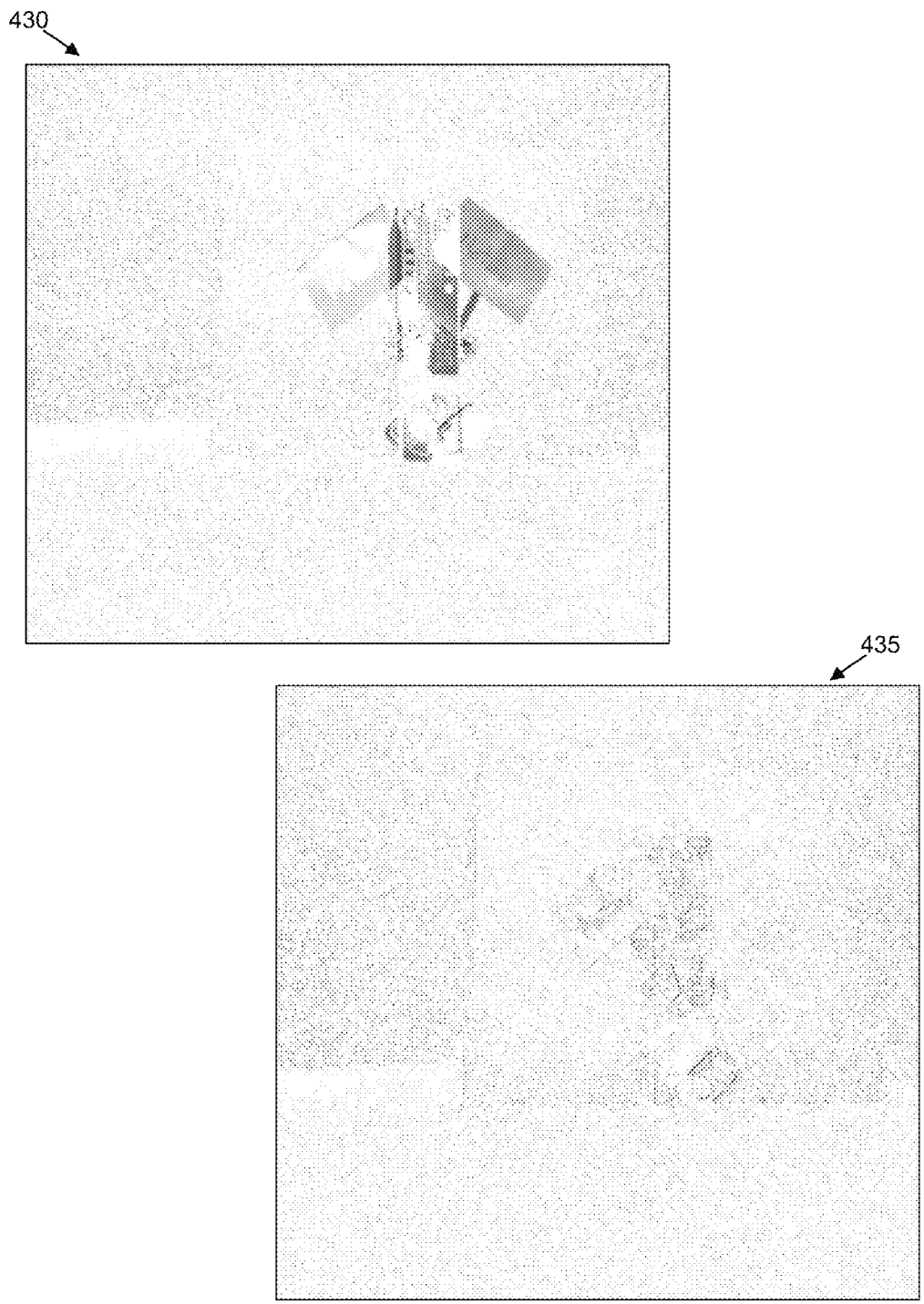
FIG. 4D is a drawing illustrating another embodiment of a first difference image and second difference image.

FIG. 4D illustrates a first difference image 430 and a second difference image 435. The first difference image 430 is generated by comparing the template image 400 to the source image 405. The first difference image 430 depicts the pixel-wise difference between the template image 400 and the source image 405. Here, light-colored regions in the first difference image 430 indicate regions of substantial similarity between the template image 400 and the source image 405. The first difference image 430 shows image difference before the hybrid registration described herein.

To generate the first difference image 430, the electronic device 105 and/or the image-processing server 115 compare a pixel-wise color difference between the template image 400 and the source image 405 to a pixel difference threshold. The pixel difference threshold is used to distinguish motion from noise in an image. In certain embodiments, the pixel difference threshold is based on a noise variance of the template image 400 (or, alternatively, of the source image 405). Image noise variance (e.g., of the template image 400) may be estimated using camera parameters (e.g., gain and exposure time) or by directly calculating the noise variance of the image.

The second different image 435 is generated by comparing the template image 400 to the second registered image 420. The second difference image 435 depicts the pixel-wise difference between the template image 400 and the second registered image 425. Again, light-colored regions in the second difference image indicate regions of substantial similarity between the template image 400 and the second registered image 425. The second different image 435 shows image difference after the hybrid registration described herein. Here, hybrid registration has limited substantially all differences originally present between the template image 405 and the source image 405. Accordingly, the second registered image 425 represents successful image registration.

Figure 4E:
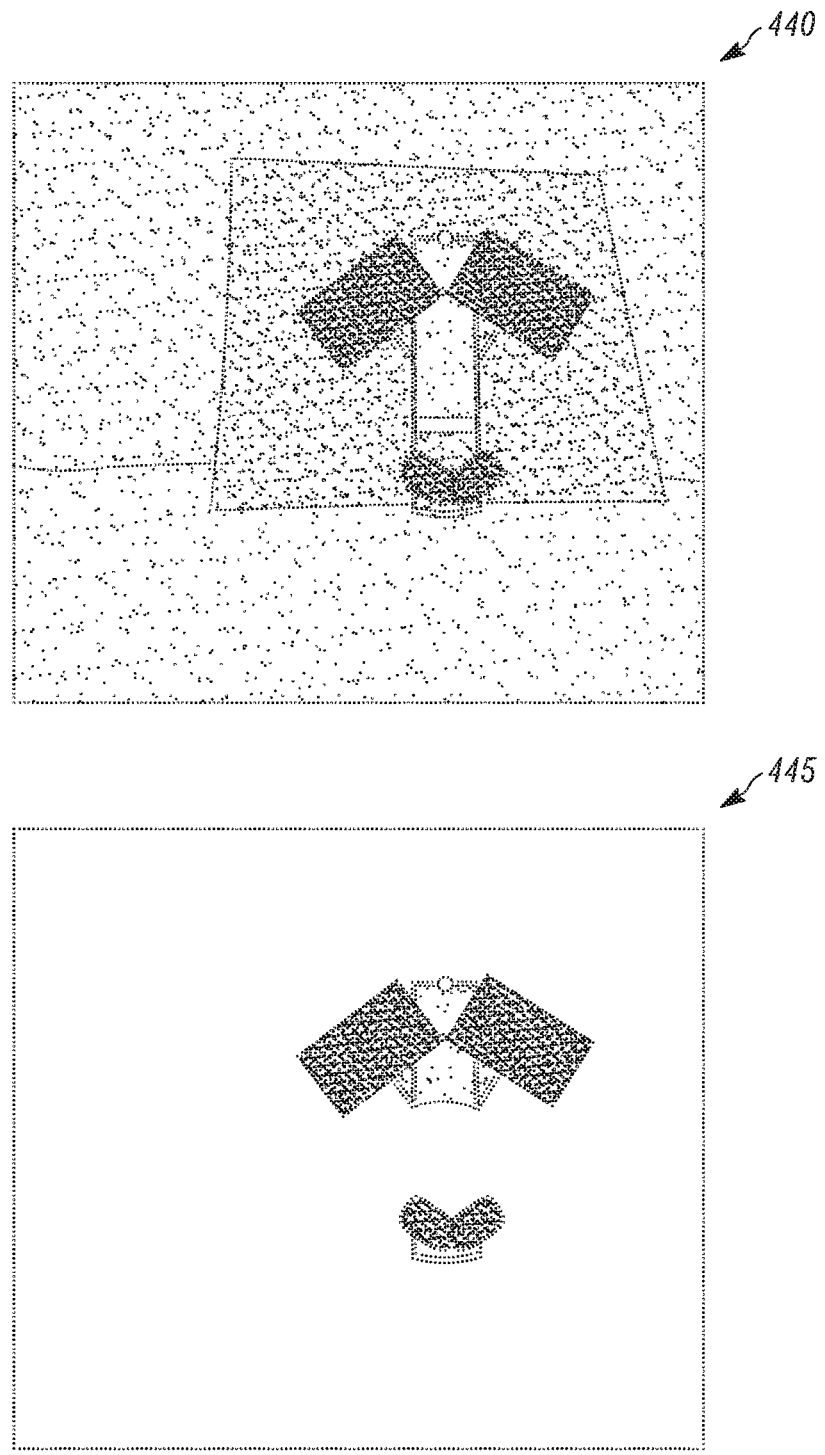
FIG. 4E is a drawing illustrating embodiments of pixel difference masks.

FIG. 4E illustrates a first pixel difference mask 440 and a second pixel difference mask 445. The pixel difference masks 440, 445 may be used in dividing image registration tasks using the hybrid registration described herein. Here, dark pixels in each mask represent areas where local registration is to be performed. By using the pixel difference masks 440, 445 local registration (a time-consuming, resource intensive process) selectively applied so as to reduce the overall time (and resources) needed to perform local registration (e.g., patch matching).

The first pixel difference mask 440, in one embodiment, is created by the electronic device 105 and/or the image-processing server 115 computing a difference image of the template image 400 and the first registered image 410 and comparing this difference image to the pixel difference threshold. The first pixel difference mask 440 is a binary image, each pixel in the first pixel difference mask 440 indicating whether the pixel difference threshold was exceeded by the corresponding pixel in the difference image. Pixels in the difference image having a difference value greater than the pixel difference threshold (e.g., the residuals) indicate locations of remaining differences between the template image 400 and the first registered image 410. If the number of residuals (e.g., of the template image 400 compared to the first registered image 410) exceed a registration error threshold, and local registration (e.g., patch matching) may be performed at the locations indicated by the first pixel difference mask 440. As depicted, there are many differences between the template image 400 and the first registered image 410, resulting in a first pixel difference mask 440 having many dark pixels.

In some embodiments, the electronic device 105 and/or the image-processing server 115 may apply a morphological filter to the first pixel difference mask 440, thereby creating the second pixel difference mask 445. The morphological filtering to the first pixel difference mask 440 removes noise from the first pixel difference mask 440. As depicted, the second pixel difference mask 445 contains fewer dark pixels and therefore fewer locations where local registration is to be performed. Here, the first pixel difference mask 440 included quite a bit of noise, potentially resulting in the electronic device 105 and/or the image processing server 115 unnecessarily performing patch matching in many regions. This is confirmed by referring back to the template image 400 and the original source image 405 which depict significant scene motion near the metronome.

Figure 5:
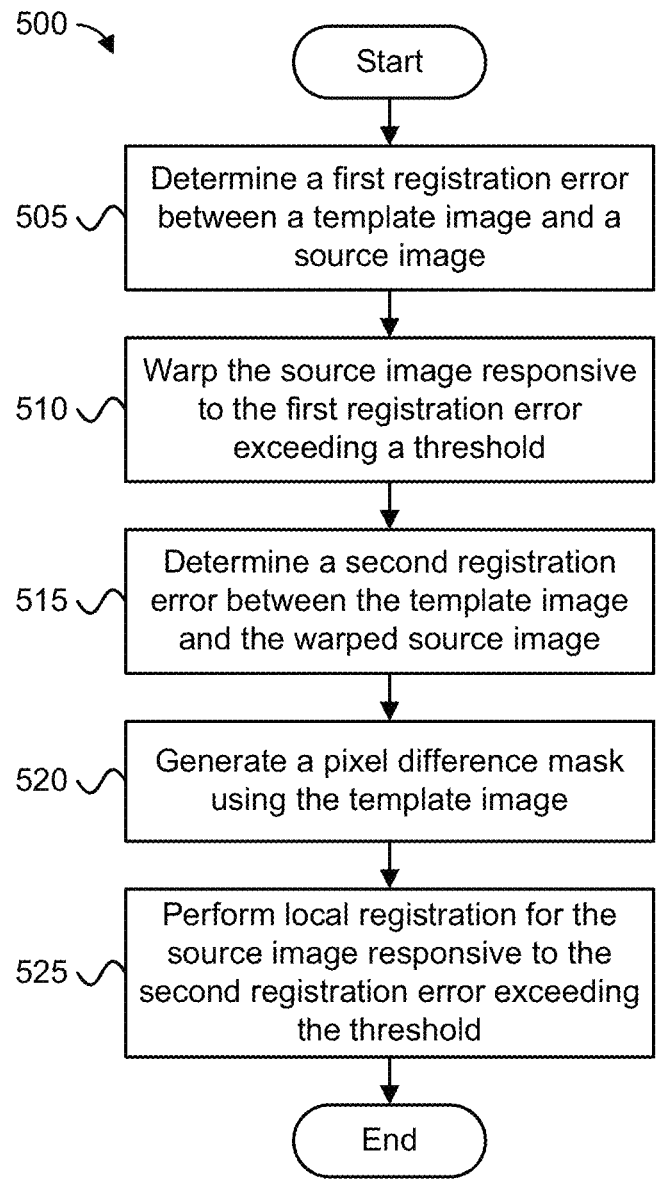
FIG. 5 is a schematic flow chart diagram illustrating another embodiment of a hybrid image registration method.

FIG. 5 illustrates a method 500 for automatic, hybrid image registration, according to embodiments of the disclosure. The method 500 performs hybrid image registration by intelligently applying global and local registration techniques to a template image and a source image. In some embodiments, the method 500 may be performed by the electronic device 105. In other embodiments, the method 500 may be performed by the image-processing server 115. In addition, the method 500 may be performed by a processor (e.g., the processor 215 and/or the processor 260) and/or other semiconductor hardware embodied in the electronic device 105 and/or the image-processing server 115. In another example, the method 500 may be embodied as computer program code stored on computer readable storage media.

The method 500 begins and determines 505 a first registration error between the template image and a source image. In one embodiment, the processor 215 and/or the processor 260 may determine 505 the first registration error between the template image (e.g., template image 300 and/or template image 400) and the source image (e.g., source image 305 and/or source image 405). In some embodiments, the registration error is determined using Equation 1, described above.

The method 500 then warps 510 the source image in response to the first registration error exceeding a registration error threshold. In one embodiment, the processor 215 and/or the processor 260 may warp 510 the source image, thereby generating a warped source image (also referred to as a first registered image). In certain embodiments, the registration error threshold may be based on a noise level of the source image (or warped source image). In other embodiments, the registration error threshold may be based on a noise level of the template image. Identifying the noise level may include identifying camera parameters and/or estimating noise variance from the image (e.g., template image, original source image, or warped source image). In some embodiments, warping 510 the source image includes generating a homography (e.g., transformation) matrix. In one embodiment, the homography matrix may be based on a downscaled template image and a downscaled source image. In such an embodiment, the homography matrix may be modified to compensate for downscaling and upscaling.

The method 500 determines 515 a second registration error between the template image and the warped source image (e.g., first registered image). In one embodiment, the processor 215 and/or the processor 260 may determine the second registration error. The method 500 also generates 520 a pixel difference mask using the template image. In one embodiment, the processor 215 and/or the processor 260 may generate 520 the pixel difference mask. In some embodiments, the pixel difference mask may be refined to remove noise. In certain embodiments, generating 520 the pixel difference mask includes comparing the template image to one of the original source image and the warped source image, based on whichever source image corresponds to the lowest registration error between the first and second registration errors.

In response to the second registration error exceeding the registration error threshold, the method 500 performs 525 local registration for the source image based on the pixel difference mask. The method 500 ends. In one embodiment, the processor 215 and/or the processor 260 may perform 525 the local registration. In certain embodiments, performing 525 local registration based on the pixel difference mask consists of performing 525 local registration only at locations/regions indicated by the pixel difference mask and ignoring all other locations/regions of the source image. In some embodiments, local registration is performed 525 as between the template image and the original source image. For example, if warping 510 the source image increases the registration error (e.g., if the second registration error is greater than the first registration error), then look registration is performed 525 as between the template image and the original source image. Otherwise, local registration is performed 525 as between the template image and the warped source image. In some embodiments, performing 525 local registration includes performing patch matching between the template and warped (or original) source image.

Figure 6:
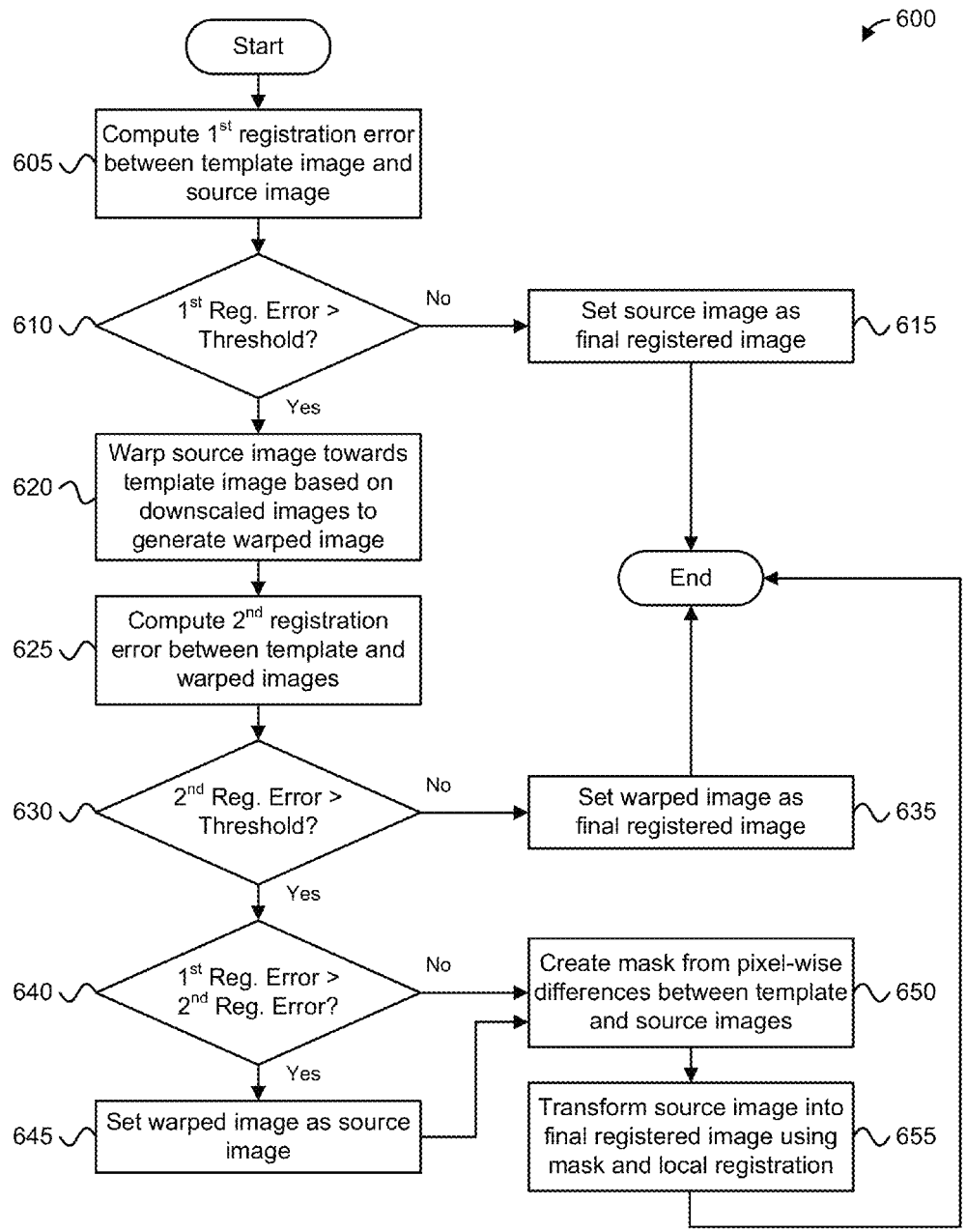
FIG. 6 is a schematic flow chart diagram illustrating another embodiment of a hybrid image registration method.

FIG. 6 illustrates a method 600 for automatic, hybrid image registration, according to embodiments of the disclosure. The method 600 performs hybrid image registration by intelligently applying global and local registration techniques to a template image and a source image. In some embodiments, the method 600 may be performed by the electronic device 105. In other embodiments, the method 600 may be performed by the image-processing server 115. In addition, the method 600 may be performed by a processor (e.g., the processor 215 and/or the processor 260) and/or other semiconductor hardware embodied in the electronic device 105 and/or the image-processing server 115. In another example, the method 600 may be embodied as computer program code stored on computer readable storage media.

The method 600 begins and computes 605 a first registration error between the template image and a source image. In one embodiment, the processor 215 and/or the processor 260 may computes 605 the first registration error between the template image (e.g., template image 300 and/or template image 400) and the source image (e.g., source image 305 and/or source image 405). In some embodiments, the registration error is determined using Equation 1, described above.

The method 600 then determines 610 whether the first registration error exceeds a registration error threshold. In one embodiment, the processor 215 and/or the processor 260 may determine 610 whether the first registration error exceeds the registration error threshold. In certain embodiments, the registration error threshold may be based on a noise level of the source image (or warped source image). In other embodiments, the registration error threshold may be based on a noise level of the template image. Identifying the noise level may include identifying camera parameters and/or estimating noise variance from the image (e.g., template image, original source image, or warped source image).

In response to the first registration error being less than the registration error threshold, the method 600 sets 615 the source image as a final registered image and the method 600 ends. Otherwise, in response to the first registration error exceeding the registration error threshold, the method 600 warps 620 the source image toward the template image based on downscaled images (e.g., a downscaled the template image and a downscaled source image) to create a warped image. In one embodiment, the processor 215 and/or the processor 260 may warped 620 the source image poured the template image. In certain embodiments, warping 620 the source image toward the template image includes generating a homography matrix based on the downscaled images. The homography matrix may be configured to compensate for the downscaling.

The method 600 then computes 625 a second registration error between the template image and the warped image. In one embodiment, the processor 215 and/or the processor 260 may compute 625 the second registration error. The method 600 then determines 630 whether the second registration error exceeds the registration error threshold. In one embodiment, the processor 215 and/or the processor 260 may determine 630 whether the second registration error exceeds the registration error threshold.

In response to the second registration error being less than the registration error threshold, the method 600 sets 635 the warped image as the final registered image and the method 600 ends. Otherwise, in response to the second registration error exceeding the registration error threshold, the method 600 determines 640 whether the first registration error exceeds the second registration error. In one embodiment, the processor 215 and/or the processor 260 may determine 640 whether the first registration error exceeds the second registration error.

In response to the first registration error exceeding the second registration error (indicative that warping 620 the source image reduced the registration error), the method 600 sets 625 the warped image as the source image and creates 650 a pixel difference mask from pixel-wise differences between the template image and the source image (e.g., now the warped image). Otherwise, in response to the first registration error not exceeding the second registration error (indicative that warping 620 of the source image increased the registration error), the method 600 creates 650 a pixel difference mask from pixel-wise differences between the template image and the source image (e.g., the original source image). In one embodiment, the processor 215 and/or the processor 260 may create 650 the pixel difference mask. In certain embodiments, creating 650 the pixel difference mask includes removing noise from an initial pixel difference mask computed from the pixel-wise differences between the images.

The method 600 then transforms 655 the source image (e.g., one of the warped image and original source image, depending on whichever image produced the lowest registration error) into the final registered image using the pixel difference mask and a local registration technique and the method 600 ends. In one embodiment, the processor 215 and/or the processor 260 may transform 655 the source image. In certain embodiments, transforming 655 the source image using local registration includes using a patch matching technique to correct scene motion in the source image. In some embodiments, transforming 655 the source image using the pixel difference mask consists of only applying the local registration technique at pixel locations indicated by the pixel difference mask.

Embodiments may be practiced in other specific forms. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

The invention claimed is:

1. A method comprising:
   determining a first registration error between a template image and a source image;
   estimating noise statistics of the source image;
   selecting a registration error threshold based on the noise statistics;
   determining whether the first registration error exceeds the registration error threshold;
   warping the source image to compensate for camera motion in response to the first registration error exceeding the registration error threshold;
   determining a second registration error between the template image and the warped source image;
   determining whether the second registration error exceeds the registration error threshold;
   generating a pixel difference mask using the template image; and
   selectively performing local registration for the source image based on the pixel difference mask in response to the second registration error exceeding the registration error threshold.

2. The method of claim 1, wherein estimating the noise statistics of the source image comprises identifying camera parameters and estimating the noise statistics of the source image using the camera parameters.

3. The method of claim 1, the method further comprising:
   comparing the first registration error to the second registration error,
   wherein selectively performing local registration for the source image based on the pixel difference mask comprises: performing a local registration technique on the warped source image in response to the first registration error exceeding the second registration error, and
   wherein selectively performing local registration for the source image based on the pixel difference mask comprises: performing a local registration technique on the source image in response to the first registration error not exceeding the second registration error.

4. The method of claim 3, wherein generating a pixel difference mask using the template image comprises:
   comparing the template image to the warped source image to produce the pixel difference mask, in response to the first registration error exceeding the second registration error; and
   comparing the template image to the source image to produce the pixel difference mask, in response to the first registration error not exceeding the second registration error.

5. The method of claim 1, wherein warping the source image to compensate for camera motion comprises:
   downscaling the template image and the source image; and
   generating a homography matrix based on the downscaled images.

6. The method of claim 5, further comprising:
   modifying the homography matrix to compensate for downscaling.

7. The method of claim 5, wherein the homography matrix comprises a pixel-based homography matrix.

8. The method of claim 1, wherein performing local registration for the source image based on the pixel difference mask comprises performing patch matching.

9. The method of claim 1, wherein determining the first registration error comprises:
   comparing the template image to the source image on a pixel-by-pixel basis; and
   counting a number of instances that a pixel in the source image differs from a corresponding pixel in the template image by more than a predefined amount, wherein the first registration error equals the number of instances.

10. An apparatus comprising:
    a processor; and
    a memory that stores code executable by the processor to:
    determine a first registration error using a template image and a source image;
    estimate an amount of noise variance of the template image;
    determine whether the first registration error exceeds a registration error threshold, the registration error threshold being selected based on the amount of noise variance;
    warp the source image to compensate for camera motion in response to the first registration error exceeding the registration error threshold;
    determine a second registration error using the template image and the warped source image;
    determine whether the second registration error exceeds the registration error threshold;
    generate a pixel difference mask using the template image; and
    selectively perform local registration for the source image based on the pixel difference mask in response to the second registration error exceeding the registration error threshold.

11. The apparatus of claim 10, the code further executable by the processor to:
    compare the first registration error to the second registration error,
    wherein the processor performing local registration for the source image based on the pixel difference mask comprises the processor performing a local registration technique on the warped source image in response to the first registration error exceeding the second registration error, and wherein the processor performing local registration for the source image based on the pixel difference mask comprises the processor performing a local registration technique on the source image in response to the first registration error not exceeding the second registration error.

12. The apparatus of claim 11, wherein the processor generating a pixel difference mask using the template image comprises the processor:

comparing the template image to the warped source image to produce the pixel difference mask, in response to the first registration error exceeding the second registration error; and comparing the template image to the source image to produce the pixel difference mask, in response to the first registration error not exceeding the second registration error.

13. The apparatus of claim 10, wherein the processor warping the source image to compensate for camera motion comprises the processor:

downscaling the template image and the source image; and generating a homography matrix based on the downscaled images.

14. The apparatus of claim 13, wherein the homography matrix comprises a feature-based homography matrix.

15. A program product comprising a computer readable storage medium that is not a transitory signal and that stores code executable by a processor to perform:

determining a first registration error using a template image and a source image;

warping the source image to compensate for camera motion in response to the first registration error exceeding a registration error threshold;

determining a second registration error using the template image and the warped source image;

generating a pixel difference mask using the template image;

comparing the first registration error to the second registration error; and selectively performing local registration using the pixel difference mask on one of the source image and the warped source image, in response to the second registration error exceeding the registration error threshold, wherein the one of the source image and the warped source image is selected based on the comparison of the first registration error to the second registration error.

16. The program product of claim 15, the code further executable by the processor to perform:

identifying a noise level of one of the source image and the template image; and setting the registration error threshold based on the noise level.

17. The program product of claim 15, the code further executable by the processor to perform:

wherein performing local registration for the source image based on the pixel difference mask comprises performing a local registration technique on the warped source image in response to the first registration error exceeding the second registration error, and wherein performing local registration for the source image based on the pixel difference mask comprises performing a local registration technique on the source image in response to the first registration error not exceeding the second registration error.

18. The program product of claim 17, wherein generating a pixel difference mask using the template image comprises:

comparing the template image to the warped source image to produce the pixel difference mask, in response to the first registration error exceeding the second registration error; and comparing the template image to the source image to produce the pixel difference mask, in response to the first registration error not exceeding the second registration error.

19. The method of claim 1, wherein estimating the noise statistics comprises:

dividing the source image into a plurality of blocks;

calculating a block noise variance for each of the plurality of blocks; and comparing each block noise variance to a variance threshold, wherein the noise variance for the source image is the arithmetic mean of the block noise variances that are less than the variance threshold.

20. The apparatus of claim 10, the code further executable by the processor to estimate the amount of noise variance of the template image by one of: estimating the noise variance of the template image based on camera parameters used to capture the template image; and estimating the noise variance of the template image based on a computed noise variance of a region of the template image.

* * * * *